(12) United States Patent
Van Wagoner, III

(10) Patent No.: US 6,772,086 B2
(45) Date of Patent: Aug. 3, 2004

(54) PROCESS TO DETERMINE IMPACT LOCATION

(75) Inventor: Earl Van Wagoner, III, Macon, GA (US)

(73) Assignee: Vibe-Tech Solutions, Inc., Dublin, GA (US)

( * ) Notice: Subject to any disclaimer, the term of this patent is extended or adjusted under 35 U.S.C. 154(b) by 0 days.

(21) Appl. No.: 09/943,633

(22) Filed: Aug. 30, 2001

(65) Prior Publication Data

US 2003/0212526 A1 Nov. 13, 2003

(51) Int. Cl.$^7$ .............................. G01C 9/00; G01S 1/08; G01S 5/14
(52) U.S. Cl. ...................... 702/150; 244/3.14; 340/539; 342/386; 342/450; 342/457; 348/144
(58) Field of Search ............................ 702/127, 92, 94, 702/150, 155; 342/126, 457, 386, 450; 340/539; 348/144; 244/3.14

(56) References Cited

U.S. PATENT DOCUMENTS

| | | | | |
|---|---|---|---|---|
| 4,740,792 A | * | 4/1988 | Sagey et al. ................. | 342/457 |
| 4,806,936 A | | 2/1989 | Williams et al. ............ | 342/126 |
| 5,382,958 A | * | 1/1995 | FitzGerald ................... | 342/386 |
| 5,432,546 A | * | 7/1995 | Cargill ........................ | 348/144 |
| 5,717,406 A | | 2/1998 | Sanderford et al. ......... | 342/457 |
| 6,057,759 A | * | 5/2000 | Marsh ......................... | 340/539 |
| 6,249,252 B1 | * | 6/2001 | Dupray ....................... | 342/450 |
| 6,318,667 B1 | * | 11/2001 | Morton ....................... | 244/3.14 |
| 6,329,948 B1 | | 12/2001 | Ishikawa ..................... | 342/457 |

* cited by examiner

Primary Examiner—John Barlow
Assistant Examiner—John H Le
(74) Attorney, Agent, or Firm—Baker, Donelson, Bearman, Caldwell & Berkowitz

(57) ABSTRACT

A process to determine the impact location of a transmitter-bearing object which is released for tracking purposes or to hit a target within a geographical area, wherein data obtained from the impact location can be used to determine the relation of the impact location and the target.

14 Claims, 1 Drawing Sheet

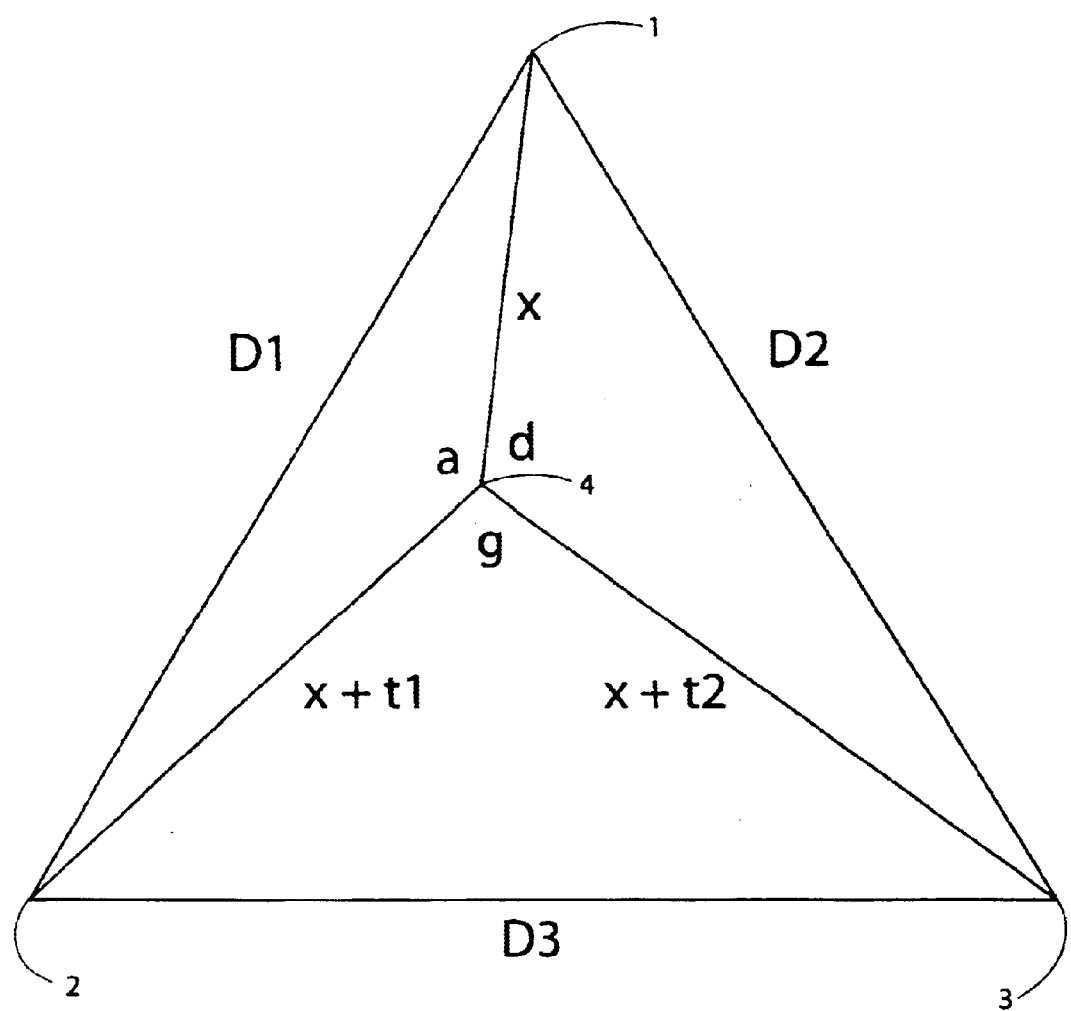

PROCESS TO DETERMINE IMPACT LOCATION

TECHNICAL FIELD

This invention relates to a process for determining impact location. In a more specific aspect, this invention relates to a process for determining the impact location of a transmitter-bearing object.

This invention will be described in many instances in regard to a process for determining (i.e., identifying) impact location, as in determining the location of a transmitter-bearing bomb upon impact with the ground. However, in a broader aspect, the process of this invention will be understood as applicable to determining the location of a transmitter-bearing object which is dynamic (i.e., in motion) but does not "impact" the ground in a similar fashion. In this broader aspect, the location of the transmitter-bearing object can be continuously determined based on the continuous transmission of a radio signal.

This invention also will be described in many instances with specific reference to a free-falling bomb as the object. However, this invention will be understood as applicable to other transmitter-bearing objects which need to be tracked, such as projectiles, guided and non-guided missiles, "smart" bombs, laser-guided bombs, infrared-guided missiles, practice (or dummy) bombs, tanks, other military and non-military vehicles, etc.

BACKGROUND OF THE INVENTION

In many instances, such as those related to military situations, the location of a target must be determined so that the target can be attacked with precision. For example, the target could be any one of a number of enemy-related installations, such as a ship, munitions storehouse, personnel location or communications facility. In the technologically-advanced military of today, laser-guided bombs or "smart bombs" are available to attack enemy targets.

In other situations, such as those in which personnel are working to sharpen their skills in hitting a target, a set of grid coordinates could be the target. In certain situations, the target may be moving in generally lateral and/or vertical directions.

However, the personnel must learn to attack targets with free-falling bombs, which are guided principally by the decision of when to release or drop the bomb. This is true especially of military personnel involved in aerial attack missions.

Military personnel must become proficient in hitting and/or destroying a target with either no misses or with a minimum number of misses. The personnel in charge of dropping or releasing a bomb need to quickly know whether the bomb was dropped too soon, too late or in the wrong direction. With this information, corrective action can be taken for the second drop, if the first drop was not successful in hitting the target. This information is essential as the free-falling bomb cannot be corrected in mid-air.

In other situations as noted above, the target may not be a real physical target, but could be a set of grid coordinates, a practice area or practice bombing range area. In these situations, pilots or other personnel responsible for releasing the transmitter-bearing bomb or other object need to know the accuracy of a practice drop. Stated in other terms, the point of impact in relation to the target (or point of desired impact) must be determined for the pilot or other personnel. With this information, their skills can be increased as they become more proficient and effective in this exercise.

Additionally, in any of these situations, whether real physical targets or otherwise, enhanced accuracy in determining the impact location at night and in adverse weather conditions is an important objective.

In the prior art, there are systems designed to assist personnel in the location of a target or other item. For example, U.S. Pat. No. 4,806,936 (1989) describes a system for determining and tracking the positions of a plurality of targets, such as aircraft. Additionally, U.S. Pat. No. 5,717,406 (1998) describes a system which can locate a radio transmitter in an unknown position in either a citywide or local area of coverage.

While accomplishing specific objectives, the prior art systems have shortcomings or disadvantages. As one example, certain of these systems do not function as effectively at night or in adverse weather conditions. Thus, there is a need in the industry for an effective and reliable system (i.e., process) to determine the impact location of an object which has been released to attack and destroy a target.

SUMMARY OF THE INVENTION

Briefly described, the present invention provides a process for determining an impact location of a transmitter-bearing object released to hit a known target (i.e., a desired point of impact). The present invention provides data related to the impact location, and this data can be used, if desired, by the appropriate personnel to determine the differences (such as distance and direction) between the impact location and the target or desired point of impact. Once these differences are known, the accuracy of the release can be determined.

As will be seen in greater detail below, this invention provides a process having advantages and benefits over the prior art.

Accordingly, an object of this invention is to provide a process to determine impact location.

Another object of this invention is to provide a process to determine the impact location of an object.

Another object of this invention is to provide a process to determine the impact location of a transmitter-bearing object.

Another object of this invention is to provide a process to determine the impact location of a transmitter-bearing free-falling object which is released to hit a target, such as a real physical target or a desired point of impact.

Still another object of this invention is to provide a process to determine the impact location of a transmitter-bearing object, such as a bomb, projectile, guided or non-guided missile, smart bomb, laser-guided bomb, infrared-guided bomb, practice bomb, tank or other military or non-military vehicle.

Still another object of this invention is to provide a process by which data is generated to identify the impact location of a transmitter-bearing object, wherein the data can be used in releasing a subsequent transmitter-bearing object.

Still another object of this invention is to provide a process to determine the impact location of a transmitter-bearing object, wherein the process is not affected by water, darkness, terrain or adverse weather conditions.

Still another object of this invention is to provide a process which can be effectively used to identify the impact location(s) of one or more transmitter-bearing objects in a land-based or water-based targeting system.

Still another object of this invention is to provide a process to determine the impact locations of multiple transmitter-bearing objects.

Still another object of this invention is to provide a process to determine the impact locations of multiple transmitter-bearing objects which are released to hit a target, such as a real physical target or a desired point of impact.

Yet still another object of this invention is to provide a process to determine the impact locations of multiple transmitter-bearing objects, such as bombs, guided or non-guided missiles, smart bombs, laser-guided bombs, infrared-guided bombs, practice bombs, tanks, other military and non-military vehicles or any combination of these objects.

Yet still another object of this invention is to provide a process by which data is generated to identify the impact locations of multiple transmitter-bearing objects, wherein the data can be used in releasing subsequent transmitter-bearing objects.

Yet still another object of this invention is to provide a process which identifies the impact locations of multiple transmitter-bearing objects, wherein the process is not affected by water, darkness, terrain or adverse weather conditions.

These and other objects, features and advantages of this invention will become apparent from the following detailed description.

BRIEF DESCRIPTION OF THE DRAWINGS

The FIGURE shows a plan view of a preferred embodiment of this invention.

DETAILED DESCRIPTION OF THE INVENTION

The present invention relates to a process to determine the impact location of a transmitter-bearing object within a geographical area containing a target, wherein the process comprises the steps of providing an object with a transmitter which upon activation transmits a unique signal, wherein the transmitter includes a non-synchronized time/frame counter to indicate a length of time during which the signal is transmitted; providing at least three stations for receiving data contained in the signal transmitted from the object and then transferring the data to a central processing station; and providing means at the central processing station to use the data in performing calculations to determine the impact location of the object.

In a preferred embodiment of this invention, the process will also include the additional steps of placing the receiving stations in a triangular configuration having an area which creates a spatial plane that geographically includes the target; determining the linear distances between the receiving stations and the central processing station; defining the spatial plane by a coordinate system to perform the calculations at the central processing station, whereby the spatial plane is correlated to the geographical plane of the target range by an algorithm; and determining correction factors which are used to adjust for signal delays in transferring data from the receiving stations to the central processing station, whereby the correction factors are based upon the differences in linear distances between the receiving stations and the central processing station.

In this invention, preferably the unique signal from the transmitter ceases upon impact of the object. However, in other embodiments of this invention, the transmitter continues to transmit the signal after impact or there is no impact of the object.

For purposes of this invention, the term "object" is used broadly and refers to any object which needs to be tracked. Examples of such objects are bombs, free-falling and laser-guided bombs, projectiles, guided and non-guided missiles, smart bombs, infrared-guided missiles, practice or dummy bombs, tanks and other military and non-military vehicles. Similarly, the term "target" is used broadly and refers to something (either physical or non-physical) to be hit. Examples of such targets are enemy ships, munitions storehouses, personnel locations, communications facilities and sets of grid coordinates.

For purposes of this application in view of the different aspects of the present invention, the term "impact" will be understood to refer to the point (or time) at which the transmitter ceases to transmit the radio signal. Thus, the impact of the transmitter-bearing object is known if the transmitter is a type which ceases transmission upon impact of the object. However, if there is no impact (for example, where the transmitter-bearing object is a moving vehicle) or if the transmitter is a type which does not cease transmission upon impact of the object, the location of the transmitter-bearing object can be continuously determined based upon the continuous transmission of the radio signal.

In operational terms, a designated target area will have at least three (3) radio receivers installed, which are adapted to receive radio signals, and the positions of the receivers are physically registered to the target area. The position of the receivers in reference to the target area will be the basis for the transformation algorithms used in describing the coordinates of the bomb in respect to the target area.

Each bomb to be tracked is fitted with a transmitter, which continually broadcasts a unique radio signal as an identifier, as well as an incriminator to ensure that the multiple receivers utilize the same exact data frame during subsequent measurements and calculations. In a preferred embodiment of this invention as described above, when the bomb impacts the ground (or impacts another object), the transmitted signal will cease.

The time differential from when the first of the three receivers acquires the data frame from the transmitter on the bomb, to when the second and third receivers acquire the same data frame, will be used to mathematically determine the position of the originating signal, relative to the three receivers and ultimately to the target area. The last data set received will be used to determine the coordinate position of the impact location of the bomb or other object.

As known in this industry, electromagnetic radiation (including radio signals) generally travels at $2.99792458 \times 10^8$ meters per second. For the calculations of this invention, $3.00 \times 10^8$ meters per second can be used, for example.

To achieve an acceptable degree of measurement resolution (such as 1 meter), and to allow for computational loss, the electronic circuits and timers need to be capable of sub-nanosecond processing. For purposes of this invention, $3.00 \times 10^8$ meters per second=0.3 meters per nanosecond.

As an example of a preferred embodiment of this invention, the signals received by each receiving station will be relayed on a radio channel for each station to the central processing station (CPS). If the receiver stations are at different distances from the CPS, which is a common configuration, the relayed signals will require a different amount of time to arrive at the CPS. Therefore, corrections to adjust for the additional time necessary for some of the signals to arrive at the CPS will be necessary for the process of this invention. The CPS will measure the time differentials between each of the 3 signals, as well as apply the appropriate corrections to account for the different distances each signal will travel from each receiver to the CPS. Triangulation calculations are then performed by the CPS, based on the time differences between the completed reception of a data frame by each of the 3 receivers multiplied by 0.3 meters for each nanosecond. The position of the bomb in reference to the receiver stations is then transformed to the reference frame of the target area. The coordinates of the bomb impact are then displayed graphically on a computer screen for immediate feedback, as well as the numerical coordinates reported for transmission to any desired system.

From the above embodiment, those skilled in this art will recognize that this invention will determine and report data which identifies the impact location of the transmitter-bearing object. If desired by the personnel in charge of the target area, this data can be used to determine any differences between the impact location and the target. Corrections can then be made for a subsequent exercise.

The measurement resolution (i.e., the precision of the data in regard to the impact location) achieved by this invention will depend upon the technology of the transmitter, receiving stations and the central processing station. If greater precision of the impact location is desired, then transmitters, receiving stations and the central processing station which employ advanced or more sophisticated technology must be used in the process of this invention.

As can be seen from this detailed description, the process of this invention can be effectively used to track and then determine (a) the impact location of a single transmitter-bearing object and (b) the impact locations of multiple transmitter-bearing objects. In regard to a single object, the transmitter will transmit a unique signed (i.e., a unique or discrete frequency) to the receiver stations. Of course, a single object represents the most basic embodiment of this invention.

With regard to multiple objects, there are options available for tracking in accordance with the present invention. The option which will be used is, of course, determined by the user of this process.

The first and preferred option when tracking multiple objects is for each transmitter to transmit a unique signal (i.e., a unique or discrete frequency) to the receiver stations, such as used when tracking a single object.

Other options for tracking multiple transmitter-bearing objects include spread spectrum and other modulation techniques known in this industry. These techniques allow for multiple signals to be modulated and, therefore, tracked.

Whether tracking single or multiple objects, each object is ultimately tracked by a unique or discrete radio signal.

Depending upon the target, transmitter-bearing bomb or other object and the impact location data, one can determine if the target is hit and/or destroyed.

In the present invention, the mathematical formula used by the central processing station is as follows:

$$\cos^{-1}\left(\frac{(x+t_2)^2+(x+t_1)^2-D_3^2}{2\times(x+t_2)\times(x+t_1)}\right)^{(g)} +$$

$$\cos^{-1}\left(\frac{x^2+(x+t_2)^2-D_2^2}{2\times(x+t_2)\times x}\right)^{(d)} + \cos^{-1}\left(\frac{(x+t_1)^2+x^2-D_1^2}{2\times(x+t_1)\times x}\right)^{(a)} = 360$$

wherein X is the unknown amount of time required for the signal upon impact of the transmitter-bearing object to reach the closest receiving station, the receipt of the signal serving to activate the counters at each receiving station; $t_1$ is the amount of time in addition to X required for the signal upon impact of the transmitter-bearing object to reach the next closest receiving station; $t_2$ is the amount of time in addition to X required for the signal upon impact of the transmitter-bearing object to reach the farthest receiving station; $D_1$ is the distance between the first and second receiving stations; $D_2$ is the distance between the first and third receiving stations; and $D_3$ is the distance between the second and third receiving stations.

With reference to the above mathematical formula, and as stated above, the impact of the transmitter-bearing object is known if the signal ceases upon impact, as in the preferred embodiment of this invention. However, in other embodiments in which the signal continues after impact or there is no impact, the location of the transmitter-bearing object can be continuously determined based upon the continuous transmission of the radio signal.

The data obtained from the calculations at the central processing station will reveal the grid coordinates of the impact location. With this data, the personnel responsible for releasing the bomb or other object can determine the bomb's distance and direction from the target and take any necessary corrective action for a subsequent bomb release.

With reference to the FIGURE which shows a preferred embodiment of this invention, a first receiving station 1 is shown in a triangular configuration with a second receiving station 2 and a third receiving station 3. The linear distances between the first and second, second and third and first and third receiving stations are indicated by $D_1$, $D_2$ and $D_3$, respectively.

In the FIGURE, the intersection 4 of the triangular areas a, d and g designates the impact location of the transmitter-bearing object. Upon impact, the time required for the signal to reach the closest receiving station (which is shown at 1 in the FIGURE) is unknown but designated by X. The receipt of the signal at receiving station 1 activates the counters at the central processing station for each signal received from receiving stations 1, 2 and 3.

The time required for the signal to reach the next closest receiving station (2) is shown in the FIGURE as $t_1+X$. The time required for the signal to reach receiving station 3 is shown in the FIGURE as $t_2+X$.

Given the linear distance $D_1$, $D_2$ and $D_3$ an given the values for t1 and t2, the mathematical formula shown above is used at the central processing station (not shown) to perform the calculations using suitable means which will determine and identify the impact location 4. The means used at the central processing station to perform the calculations are well known in the industry, but preferably comprise computers and computer-related products.

An advantage of the process of this invention using radio triangulation to measure the location of a bomb strike, verses other optical or photographic systems, is that there are no visibility issues to overcome (such as darkness, storms or other adverse weather conditions) as radio signals are not adversely affected by these conditions. Additionally, this invention provides a process which can be used in various types of terrain, such as mountains, water, hills, valleys, etc.

Another unique advantage of using a radio signal for each bomb, as compared to a sonic or seismic system, is the ability to simultaneously monitor multiple bomb signals and identify such signals as being delivered from the same vehicle or from different delivery vehicles.

With this invention, the time from when the impact location(s) have been computed by the CPS, to when the results will be available for delivery to the pilot, commander, etc., can be a matter of seconds or even less.

The process of this invention also can be effectively used when the transmitter-bearing object has an impact location outside of the triangular configuration formed by the three receiving stations. The basic requirement in this situation is that the receiving stations are positioned within range of the transmitter on the bomb or other object.

With the process of this invention, until the transmitter ceases to transmit the radio signal, the location of a transmitter-bearing object can be continuously determined based upon the continuous transmission of the radio signal.

The present invention has been described in detail with particular reference to certain embodiments, but variations and modifications can be made without departing from the spirit and scope of the invention as defined in the following claims.

What is claimed is:

1. A process for determining an impact location of a transmitter-bearing object within a geographical area containing a target, wherein the process comprises the steps of:
   a. providing an object with a transmitter which upon activation transmits a unique signal, wherein the transmitter includes a non-synchronized time/frame counter to indicate a length of time during which the signal is transmitted;
   b. providing at least three stations for receiving data contained in the signal transmitted from the object and then transferring the data to a central processing station; and
   c. providing means at the central processing station to use the data in performing calculations to determine the impact location of the object, wherein the calculations performed at the central processing station are performed using the following mathematical formula:

$$\cos^{-1}\left(\frac{(x+t_2)^2 + (x+t_1)^2 - D_3^2}{2\times(x+t_2)\times(x+t_1)}\right) \overset{(g)}{+}$$

$$\cos^{-1}\left(\frac{x^2 + (x+t_2)^2 - D_2^2}{2\times(x+t_2)\times x}\right) \overset{(d)}{+} \cos^{-1}\left(\frac{(x+t_1)^2 + x^2 - D_1^2}{2\times(x+t_1)\times x}\right) \overset{(a)}{=} 360$$

wherein x is the unknown amount of time required for the signal upon impact of the transmitter-bearing object to reach the closest receiving station, the receipt of the signal serving to activate the counters at each receiving station; $t_1$ is the amount of time in addition to x required for the signal upon impact of the transmitter-bearing object to reach the next closest receiving station; $t_2$ is the amount of time in addition to x required for the signal upon impact of the transmitter-bearing object to reach the farthest receiving station; $D_1$ is the distance between the first and second receiving stations; $D_2$ is the distance between the first and third receiving stations; and $D_3$ is the distance between the second and third receiving stations.

2. A process as defined by claim 1, wherein the process comprises the additional steps of:
   d. placing the receiving stations in a triangular configuration having an area which creates a spatial plane that geographically includes the target;
   e. determining the linear distances between the receiving stations and the central processing station;
   f. defining the spatial plane by a coordinate system to perform the calculations at the central processing station, whereby the spatial plane is correlated to the geographical plane of the target range by an algorithm; and
   g. determining correction factors which are used to adjust for signal delays in transferring data from the receiving stations to the central processing station, whereby the correction factors are based upon the differences in linear distances between the receiving stations and the central processing station.

3. A process as defined by claim 1, wherein the transmitter-bearing object is a projectile, bomb, free-falling bomb, laser-guided missile, smart bomb, infrared-guided missile, practice bomb, tank or other military or non-military vehicle.

4. A process as defined by claim 3 wherein the transmitter-bearing object is a bomb.

5. A process as defined by claim 3 wherein the transmitter-bearing object is a practice bomb.

6. A process as defined by claim 1 wherein the target is a physical or non-physical thing.

7. A process as defined by claim 1 wherein the target is an enemy ship, munitions storehouse, personnel location; communications facility or a set of grid coordinates.

8. A process as defined by claim 7 wherein the target is a set of grid coordinates.

9. A process as defined by claim 1 wherein the receiving stations create a spatial plane which does not include the target.

10. A process as defined by claim 1 wherein the impact locations of a plurality of transmitter-bearing objects can be determined.

11. A process as defined by claim 1 wherein the signal ceases upon impact of the transmitter-bearing object.

12. A process as defined by claim 1 wherein the signal continues after impact of the transmitter-bearing object.

13. A process as defined by claim 1 wherein there is no impact of the transmitter-bearing object.

14. A process for determining an impact location of a transmitter-bearing object within a geographical area containing a target, wherein the process comprises the steps of:
   a. providing an object with a transmitter which upon activation transmits a unique signal, wherein the transmitter includes a non-synchronized time/frame counter to indicate a length of time during which the signal is transmitted;
   b. providing at least three stations for receiving data contained in the signal transmitted from the object and then transferring the data to a central processing station; and
   c. providing means at the central processing station to use the data in performing calculations to determine the impact location of the object, wherein the calculations performed at the central processing station are performed using the following mathematical formula:

$$\cos^{-1}\left(\frac{(x+t_2)^2 + (x+t_1)^2 - D_3^2}{2\times(x+t_2)\times(x+t_1)}\right) \overset{(g)}{+}$$

$$\cos^{-1}\left(\frac{x^2 + (x+t_2)^2 - D_2^2}{2\times(x+t_2)\times x}\right) \overset{(d)}{+} \cos^{-1}\left(\frac{(x+t_1)^2 + x^2 - D_1^2}{2\times(x+t_1)\times x}\right) \overset{(a)}{=} 360$$

wherein x is the unknown amount of time required for the signal upon impact of the transmitter-bearing object to reach the closest receiving station, the receipt of the signal serving to activate the counters at each receiving station; $t_1$ is the amount of time in addition to x required for the signal upon impact of the transmitter-bearing object to reach the next closest receiving station; $t_2$ is the amount of time in addition to x required for the signal upon impact of the transmitter-bearing object to reach the farthest receiving station; $D_1$ is the distance between the first and second receiving stations; $D_2$ is the distance between the first and third receiving stations; and $D_3$ is the distance between the second and third receiving stations; and wherein $D_1$, $D_2$ and $D_3$ are constant values.

* * * * *